Figure 1:
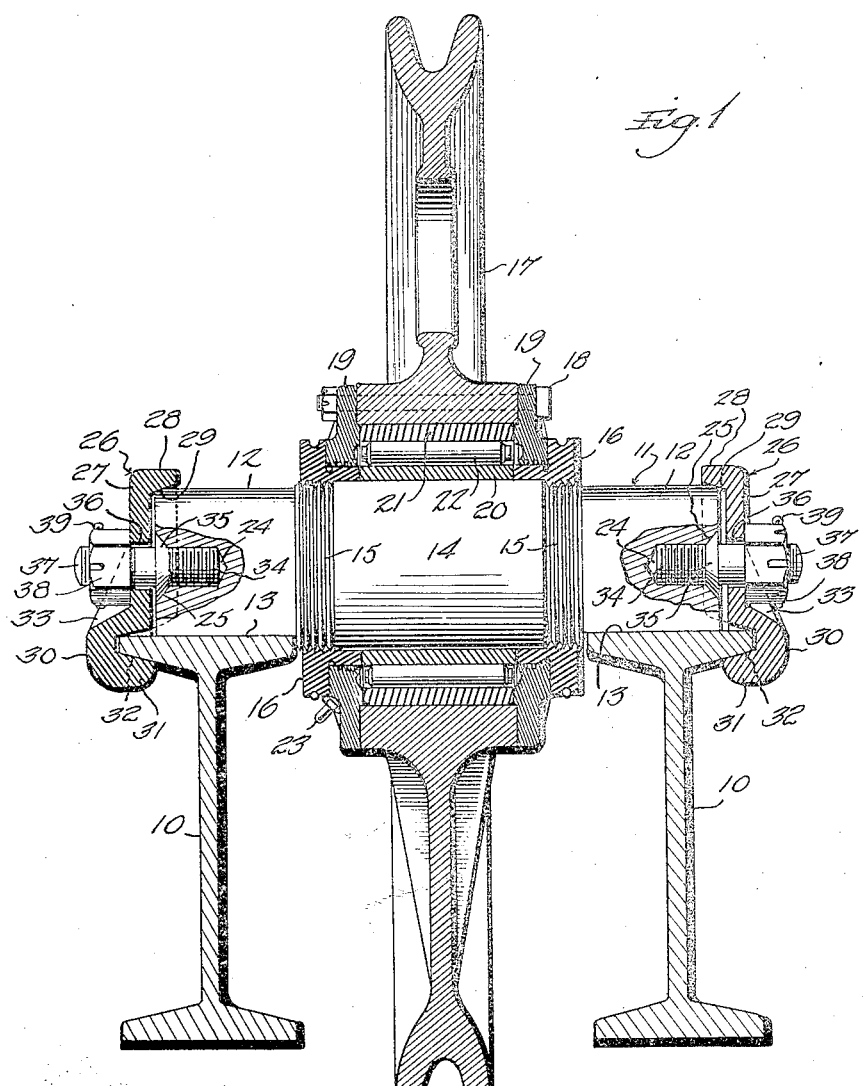

Oct. 17, 1933.    W. SCHWEMLEIN    1,930,626
CROWN BLOCK ASSEMBLY
Filed Feb. 3, 1930

Inventor
WILLIAM SCHWEMLEIN
By C. L. Parker Jr.
Attorney

Patented Oct. 17, 1933

1,930,626

UNITED STATES PATENT OFFICE 1,930,626

CROWN BLOCK ASSEMBLY

William Schwemlein, Parkersburg, W. Va., assignor to The Parkersburg Rig & Reel Company, Parkersburg, W. Va., a corporation of West Virginia Application February 3, 1930. Serial No. 425,665

6 Claims. (Cl. 308—18)

This invention relates to crown block assemblies for drilling derricks, and more particularly to means for securing the shafts of such assemblies on the horizontal supporting beams.

An important object of the invention is to provide novel securing elements for opposite ends of the shafts of crown block assemblies whereby such shafts may be easily and securely fastened in position on the beams of the crown block assembly.

A further object is to provide an integral securing element for each end of each shaft of the crown block assembly and adapted to position the shaft with respect to the supporting beams and to secure the shaft in such position.

A further object is to provide a securing element of the character referred to having a substantially conical recess in one face thereof to receive one end of a shaft, and having a depending horizontally elongated recess for receiving a flange of a supporting beam whereby the shaft may be secured in proper position on the beam.

A further object is to provide a securing element of the character referred to which is adapted to be secured to one end of a shaft and to a supporting beam with the use of a single fastening element.

Other objects and advantages of the invention will become apparent during the course of the following description.

Figure 2:
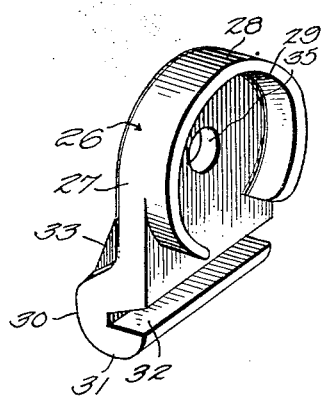

In the drawing I have shown one embodiment of the invention. In this showing,

Figure 1 is a transverse vertical sectional view showing the invention applied, and, Figure 2 is a perspective view of one of the securing elements.

Referring to Figure 1, the numeral 10 designates a pair of horizontal beams associated with the crown block assembly of a derrick of the type employed in drilling oil wells and the like. The crown block assembly includes a number of the beams 10, in accordance with the usual practice, and it is customary to mount six sheaves in the crown block assembly over which pass cables for performing the various operations involved in the drilling of oil wells.

In Figure 1 of the drawing, one of the sheave assemblies has been illustrated. A shaft indicated as a whole by the numeral 11 is mounted across the beams 10 and is provided with reduced end portions 12 flattened at their bottoms as at 13 to provide bearing surfaces resting upon the upper flanges of the beams 10. The shaft is provided with an enlarged central portion 14 threaded at its ends as at 15.

Retaining rings 16 are mounted on the threaded portions 15 of the shaft to retain the sheave and associated elements in position on the shaft. The sheave is indicated by the numeral 17 and is bolted as at 18 to end plates 19. A bearing assembly is mounted inwardly of the plates 19 and includes an inner stationary ring 20, an outer rotating sleeve 21 secured to the sheave, and intermediate anti-friction bearings 22. Lubricant may be introduced to the bearings 22 through a suitable fitting 23.

Each end of the shaft 11 is provided with an axial threaded opening 24 flared outwardly at its outer end as at 25 to form a conical recess. A positioning or clamping member 26 is mounted adjacent each end of the shaft as shown in Figure 1. The clamping member includes a flat body portion 27 having an arcuate inwardly extending flange 28 provided with a conical inner face 29 in which the adjacent end of the shaft 11 is adapted to be mounted. Beneath the body portion 27, the clamping member extends outwardly and downwardly as at 30 and thence inwardly as at 31 to form a flange adapted to engage beneath the top flange of one of the rails 10. The upper surface of the flange 31 is tapered as at 32 to correspond to the inclination of the under side of the flange of the beam 10. The clamping member is preferably provided with reinforcing webs 33 extending beneath the body portion 27 and the depending portion 30.

A single fastening element is adapted to secure each clamping member in position. As shown in Figure 1, each fastening element includes an inner threaded shank 34 mounted in the opening 24 and the threaded shank terminates in a conical flange 35 adapted to seat in the conical recess 25. The outer portion of the fastening element extends through an opening 36 formed in the clamping member and is threaded at its end as at 37. A clamping nut 38 is threaded on the outer end of the fastening element and is preferably held in clamped position by a cotter pin 39.

The operation of the device is as follows:

As previously stated, the crown block assembly includes a number of the sheave mountings for the various cable operations incident to the drilling of a well, some of the shafts having their central portions 14 elongated to carry two of the sheave members. In any case, however, the means for securing the shafts in position will be identical with that illustrated in Figure 1.

In assembling the structure, the fastening elements have their threaded shanks 34 mounted in the axial openings 24 of the shaft, whereupon the shaft is mounted transversely of the beams 10 with the flat sides 13 of the ends of the shaft seated upon the tops of the beams. The clamping members 27 are then placed in position with their flanges 28 receiving the extremities of the shaft within the conical recess 29, the outer end of the fastening element extending through the opening 36 in the clamping member. It also will be apparent that the outer edge portion of the top flange of each beam 10 will be arranged in the corresponding recess formed by the bottom flange 31 of the clamping member. The nut 38 is then applied and tightened, whereby the flange 31 will be caused to firmly engage the flange of the beam 10, while the wall of the conical recess 29 will be clamped against the end of the shaft 11 and will be properly centered with respect thereto. The cotter pin 39 then may be applied to hold the nuts 38 in proper position.

As previously stated, the bottom flanges 31 of the clamping members 27 are elongated, and accordingly they afford a firm anchorage for the clamping members 27. The shaft accordingly will be anchored against rotation and against displacement either laterally or longitudinally and only one fastening element is necessary for each of the clamping members. The device is simple in construction and cheap to manufacture, and in practice it has been found that the clamping members can be quickly and readily applied and efficiently perform their function of securing the crown block shafts in proper position against displacement.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device for securing a shaft to a support therefor comprising a body extending across and having a portion adapted to be frictionally clamped against one extremity of the shaft and another portion facing in the same direction as said first named portion and adapted to be clamped against the support, and a fastening element substantially axial of the shaft for securing said body in clamped relation against said shaft and said support.

2. A device for securing a shaft to a support therefor comprising a body extending across and having a recess therein corresponding in shape to and adapted to receive one extremity of the shaft and having a portion adapted to be clamped against the support, and a fastening element substantially axial of the shaft for securing said body to said shaft with the extremity of the latter clamped in said recess, and for clamping said portion of the body against the support.

3. A device for securing a shaft to a support therefor comprising a cap extending across and adapted to engage one extremity of the shaft and provided with a radially extended portion adapted to engage against a portion of the support, and a fastening element connected to the end of the shaft axially thereof for moving said cap in one direction into clamped engagement with the extremity of the shaft and the support.

4. A device for securing a shaft to a support therefor comprising a cap having an arcuate flange provided with a conical inner face adapted to be clamped against one end portion of the shaft, said cap being further provided with a radially offset recess adapted to receive a portion of the support, and a single fastening element connected to the shaft for securing said cap in position with respect to the shaft and support.

5. A device for securing a shaft to a flanged support therefor comprising a cap having a conical recess adapted to receive one end portion of the shaft, said cap being further provided with a radially offset portion having an elongated transversely tapered recess adapted to receive the flange of the support, and a bolt mounted axially in the end of the shaft and projecting through said cap, said bolt including a nut threaded thereon and engageable against the outer face of said cap.

6. A device for securing a shaft to a flanged support comprising a body having a tapered recess therein adapted to receive one end of the shaft, and having a second recess adapted to receive a portion of the flange of the support, and a fastening element connected to the shaft axially thereof for clamping said body in position with the end of said shaft seated in said tapered recess and with a portion of the flange in said second recess.

WILLIAM SCHWEMLEIN.